US005539398A

United States Patent [19]

Hall et al.

[11] Patent Number: 5,539,398

[45] Date of Patent: Jul. 23, 1996

[54] GPS-BASED TRAFFIC CONTROL PREEMPTION SYSTEM

[75] Inventors: Timothy J. Hall, North St. Paul, Minn.; Mark A. Schwartz, River Falls, Wis.; Steven M. Hamer, Willernie, Minn.

[73] Assignee: Minnesota Mining and Manufacturing Company, St. Paul, Minn.

[21] Appl. No.: 515,933

[22] Filed: Aug. 16, 1995

Related U.S. Application Data

[63] Continuation of Ser. No. 178,881, Jan. 7, 1994, abandoned.

[51] Int. Cl.[6] .............................. G08G 1/095; G06F 7/70

[52] U.S. Cl. .......................... 340/907; 340/906; 340/988; 340/990; 340/995; 364/436; 364/424.01

[58] Field of Search .................................... 340/907, 906, 340/988, 989, 990–993, 995, 424.01, 424.02; 364/449, 450, 436, 437, 443

[56] References Cited

U.S. PATENT DOCUMENTS

| | | | |
|---|---|---|---|
| 2,355,607 | 3/1940 | Shepherd | 177/337 |
| 3,831,039 | 8/1974 | Henschel | 307/234 |
| 3,886,515 | 5/1975 | Cottin et al. | 340/994 |
| 4,162,477 | 7/1979 | Munkberg | 340/32 |
| 4,230,992 | 10/1980 | Munkberg | 328/140 |
| 4,443,783, | 4/1984 | Mitchell | 340/32 |
| 4,573,049 | 2/1986 | Obeck | 340/924 |
| 4,701,760 | 10/1987 | Raoux | 340/993 |
| 4,713,661 | 12/1987 | Boone et al. | 340/994 |
| 4,734,863 | 3/1988 | Honey et al. | 364/449 |
| 4,734,881 | 3/1988 | Klein et al. | 364/900 |
| 4,791,571 | 12/1988 | Takahashi et al. | 364/436 |

(List continued on next page.)

FOREIGN PATENT DOCUMENTS

| | | |
|---|---|---|
| 0574009A2 | 12/1993 | European Pat. Off. . |
| 2670002 | 6/1992 | France . |
| 2693820 | 1/1994 | France . |

OTHER PUBLICATIONS

Ivan A. Getting, "The Global Positioning System", *IEEE Spectrum*, Dec. 1993, pp. 36–47.

Megadyne Information Systems, Software Product Briefs, Jan. 1987.

Megadyne Information Systems, V–TRAX Automated Vehicle Monitoring Information System, Jan. 1988, pp. 1–7.

METS, Inc., Automatic Vehicle Location Vehicle Management System Brochure Jan. 1994.

Differential Corrections Inc. (DCI), Differential Correction Services Product Brochures Jan. 1994.

Motorola, Automatic Vehicle Location System Brochure, Jan. 1985.

Motorola, Automatic Vehicle Locatin System Brochure, Jan. 1986.

Morrow, Inc., Vehical Tracking Brochure, Jan. 1987.

Etak Emergency Response System Brochure Jan. 1994.

ETAK, Inc. Product Brochures, Jan. 1986.

ACCQPOINT, Low–Cost Nationwide Real–Time Differential GPS Product Brochure, Jan. 1993.

*Primary Examiner*—Donnie L. Crosland

*Attorney, Agent, or Firm*—Gary L. Griswold; Walter N. Kirn; Kari H. Bartingale

[57] ABSTRACT

A traffic control preemption system uses data received from a global positioning system (GPS) to determine whether a vehicle issuing a preemption request is within an allowed approach of an intersection. GPS signals are received and processed by the vehicle module to generate vehicle data, including the vehicle's position, heading and velocity. The vehicle data is transmitted via radio transmission or some other medium. Each intersection has an associated intersection module which, if within range of the vehicle's transmitting equipment, compares the received vehicle data with a preprogrammed map of allowed approaches to the intersection. If the vehicle data sufficiently matches the map of allowed approaches, the vehicle's preemption request is forwarded to the intersection controller to appropriately control the phase of the traffic signal at the intersection.

19 Claims, 9 Drawing Sheets

U.S. PATENT DOCUMENTS

| | | | |
|---|---|---|---|
| 4,799,162 | 1/1989 | Shinkawa et al. | 364/436 |
| 4,914,434 | 4/1990 | Morgan et al. | 340/906 |
| 4,963,889 | 10/1990 | Hatch | 342/357 |
| 5,043,736 | 8/1991 | Darnell et al. | 342/357 |
| 5,068,656 | 11/1991 | Sutherland | 340/989 |
| 5,072,227 | 12/1991 | Hatch | 342/357 |
| 5,119,102 | 6/1992 | Barnard | 342/357 |
| 5,172,113 | 12/1992 | Hamer | 340/907 |
| 5,177,489 | 1/1993 | Hatch | 342/357 |
| 5,214,757 | 5/1993 | Mauney et al. | 340/990 |
| 5,334,974 | 8/1994 | Simms et al. | 340/990 |
| 5,345,232 | 9/1994 | Robertson | 340/995 |
| 3,550,0778 | 3/1967 | Long | 340/32 |

GPS-BASED TRAFFIC CONTROL PREEMPTION SYSTEM

This is a continuation of application Ser. No. 08/178,881 filed Jan. 7, 1994, now abandoned.

FIELD OF THE INVENTION

This invention relates to a traffic preemption system and, more particularly, to a preemption system that receives data from a global positioning system (GPS) to track the approach of a vehicle requesting preemption of a traffic signal.

BACKGROUND

Traffic signals have long been used to regulate the flow of traffic. Generally, traffic signals have relied on timers or vehicle sensors to determine when to change the phase of traffic signal lights, thereby signaling alternating directions of traffic to stop, and others to proceed.

Emergency vehicles, such as police cars, fire trucks and ambulances, are generally permitted to cross an intersection against a traffic signal. Emergency vehicles have typically depended on horns, sirens and flashing lights to alert other drivers approaching the intersection that an emergency vehicle intends to cross the intersection. However, due to hearing impairment, road noise, air conditioning, audio systems and other distractions, a driver of a vehicle approaching an intersection will often not be aware of the warning signal being emitted by an approaching emergency vehicle, thus resulting in a dangerous situation.

This problem was addressed in the commonly assigned U.S. Pat. No. 3,550,078 to Long, which is incorporated herein by reference. The Long patent discloses that as an emergency vehicle approaches an intersection, the emergency vehicle emits a preemption request comprised of a stream of light pulses occurring at a predetermined repetition rate. A photocell, which is part of a detector channel, receives the stream of light pulses emitted by the approaching emergency vehicle. An output of the detector channel is processed by a phase selector, which then issues a phase request to a traffic signal controller to change or hold green the traffic signal light that controls the emergency vehicle's approach to the intersection.

While the system disclosed by Long proved to be a commercial success, it became apparent that the system did not have adequate signal discrimination. In addition, the length of time during which the pulse request signal remained active after the termination of light pulses was not uniform and sometimes too short to allow safe transit of the emergency vehicle.

Commonly assigned U.S. Pat. No. 3,831,039 (Henschel), which is incorporated herein by reference, improves on the system disclosed in the Long patent by improved selectivity of low repetition rate light sources of gas discharge lamps, such as fluorescent lights, neon signs, and mercury vapor lights. Further, Henschel improves the discrimination between a series of equally spaced light pulses and a series of irregularly spaced light pulses such as lightning flashes.

In the system disclosed by Henschel, the stream of light pulses must have proper pulse separation and continue for a predetermined period of time. Also, once a preemption call is issued to the traffic signal controller, the preemption call must remain active for at least a predetermined time period. The discrimination circuit disclosed by Henschel provides an improvement over the discrimination circuit disclosed by Long and results in improved discrimination.

Although such systems contemplated that preemption systems would be used for emergency vehicles, it was desirable to use them with non-emergency vehicles such as buses and maintenance vehicles. It thus became necessary to differentiate between different types of emergency and non-emergency vehicles. The commonly assigned U.S. Pat. Nos. 4,162,477 (Munkberg) and 4,230,992 (Munkberg), which are incorporated herein by reference, disclose an optical traffic preemption system wherein different vehicles transmit preemption requests having different priority levels, and in which the signal controller can discriminate between requests of differing priority and give precedence to the higher priority signal. The optical emitter disclosed by Munkberg transmits light pulses at a variety of selected predetermined repetition rates, with the selected repetition rate indicative of a priority level.

Commonly assigned U.S. Pat. No. 4,734,881 (Klein and Oran) which is incorporated herein by reference, provides for performance of the optical preemption functions with logic based circuity replacing a large number of discrete and dedicated circuits. The microprocessor circuitry utilizes a windowing algorithm to validate that pulses of light were transmitted from a valid optical traffic preemption system emitter.

Commonly assigned U.S. Pat. No. 5,172,113 (Hamer) which is incorporated herein by reference, discloses a method of optically transmitting data from an optical emitter to a detector mounted along a traffic route used specifically to receive data or to an optical traffic preemption system located at an intersection. Hamer allows variable data to be transmitted in a stream of light pulses by interleaving data pulses between priority pulses. For example, an emergency vehicle can transmit data in a stream of light pulses from an optical emitter that can include an identification code that uniquely identifies the emitter, an offset code that causes a phase selector to create a traffic signal timing cycle offset, and an operation code that causes traffic signal lights to assume at least one phase. Further, an emitter can transmit setup information, for example a range setting code that causes a phase selector to set a threshold to which future optical transmissions will be compared. Phase selectors constructed in accordance with the Hamer disclosure are provided with a discrimination algorithm which is able to track a plurality of optical transmissions with each detector channel. Optical emitters as disclosed by Hamer are provided with a coincidence avoidance mechanism which causes overlapping optical transmission from separate optical emitters to drift apart. Hamer discloses an optical signal format that allows variable data to be transmitted, while maintaining compatibility with existing optical traffic preemption systems.

One problem with all of the above described optical systems is that they require a line-of-sight to the signal controller at the intersection due to the optical nature of the preemption signal. Thus, while they may work acceptably for road systems which follow a rectangular grid pattern, they suffer several disadvantages. For example, where approaches to an intersection are blocked from line-of-sight or follow an irregular, curved or abruptly angled pattern, optically-based systems are not effective because they require a line of sight to the receiver.

Radio based, as opposed to optically based systems, for traffic control preemption have also been developed. For example, U.S. Pat. No. 2,355,607 (Shepherd) describes radio communications systems for vehicular traffic control wherein a directional transmission and/or reception located at the intersection, or on the vehicle, provides traffic light control based on coded signals transmitted from emergency vehicles. However, the inherent lack of directional precision of the radio system causes numerous traffic lights positioned parallel to the direction of travel to be affected. This is a major disadvantage because such prior art radio transmitter systems may erroneously pre-empt signal lights which are not on the approach route of an on-coming vehicle demanding preemption.

Radio transmitter systems also suffer from range inaccuracies which may be caused by signal attenuation or reflection. For example, a building may block, reflect, or attenuate a radio frequency which is not a line-of-sight signal. Since radio transmitter systems typically use signal strength to estimate range, signal attenuation gives rise to inaccurate range estimates at the receiving intersection electronics. Adverse weather, such as precipitation or fog, may also adversely affect the range sensitivity of existing radio transmitter dependent systems.

Efforts to reinforce radio systems with additional control functions are disclosed in U.S. Pat. No. 4,443,783 (Mitchell) wherein a directional transmitter is located in the approaching vehicle with omnidirectional receivers at intersections and multiple frequencies, selected frequency combinations, and selected red and amber light combinations provide accommodation for inaccuracies. U.S. Pat. No. 4,573,049 (Orbeck) discloses two way communication of information on intersection preemption request and action.

A major drawback of radio transmitters is that while they do not require a line-of-sight approach, their inherent lack of directionality means that they may erroneously control a signal light which is not on the vehicle's route but which is proximate the route.

There is therefor a need for a traffic preemption system for locations where approaches to an intersection are not line-of-sight or where road systems do not follow a rectangular grid pattern. Such a system would desirably offer the following advantages: (1) discretion without the need for a strobe as used in optical systems; (2) immunity from weather effects on system range; and (3) capability for easy implementation in applications with curving or abruptly angled approaches.

SUMMARY

The present preemption system provides a traffic control preemption system using data received from a global positioning system (GPS). GPS signals are received and processed by a GPS receiver and a processor module in the vehicle to generate navigational vehicle data, such as position, heading and velocity. The vehicle data, along with other data such as vehicle identification codes, priority codes or a preemption request, are transmitted via radio waves or some other medium. Each intersection is equipped with an intersection module adapted to receive and process the vehicle data. Each intersection module contains a preprogrammed map of allowed approaches to the intersection. Each intersection module within range of a vehicles transmitting equipment compares the received vehicle data with the map of allowed approaches. If the vehicle data sufficiently matches the map of allowed approaches to a particular intersection, the intersection module forwards the vehicle's preemption request to the intersection controller.

The present preemption system also preferably includes speed and heading sensors which provide vehicle data in areas of GPS signal obstruction or multipath. The system also provides multiple priority levels for different types of vehicles requesting preemption. In addition to traffic signal preemption, the system may also be used to provide for automatic vehicle location information for scheduling or traffic flow control purposes.

BRIEF DESCRIPTION OF THE DRAWINGS

The various objects, features, and advantages of the present preemption system will become apparent upon reading and understanding the following detailed description and accompanying drawings in which.

DETAILED DESCRIPTION OF THE PREFERRED EMBODIMENT

Figure 1:
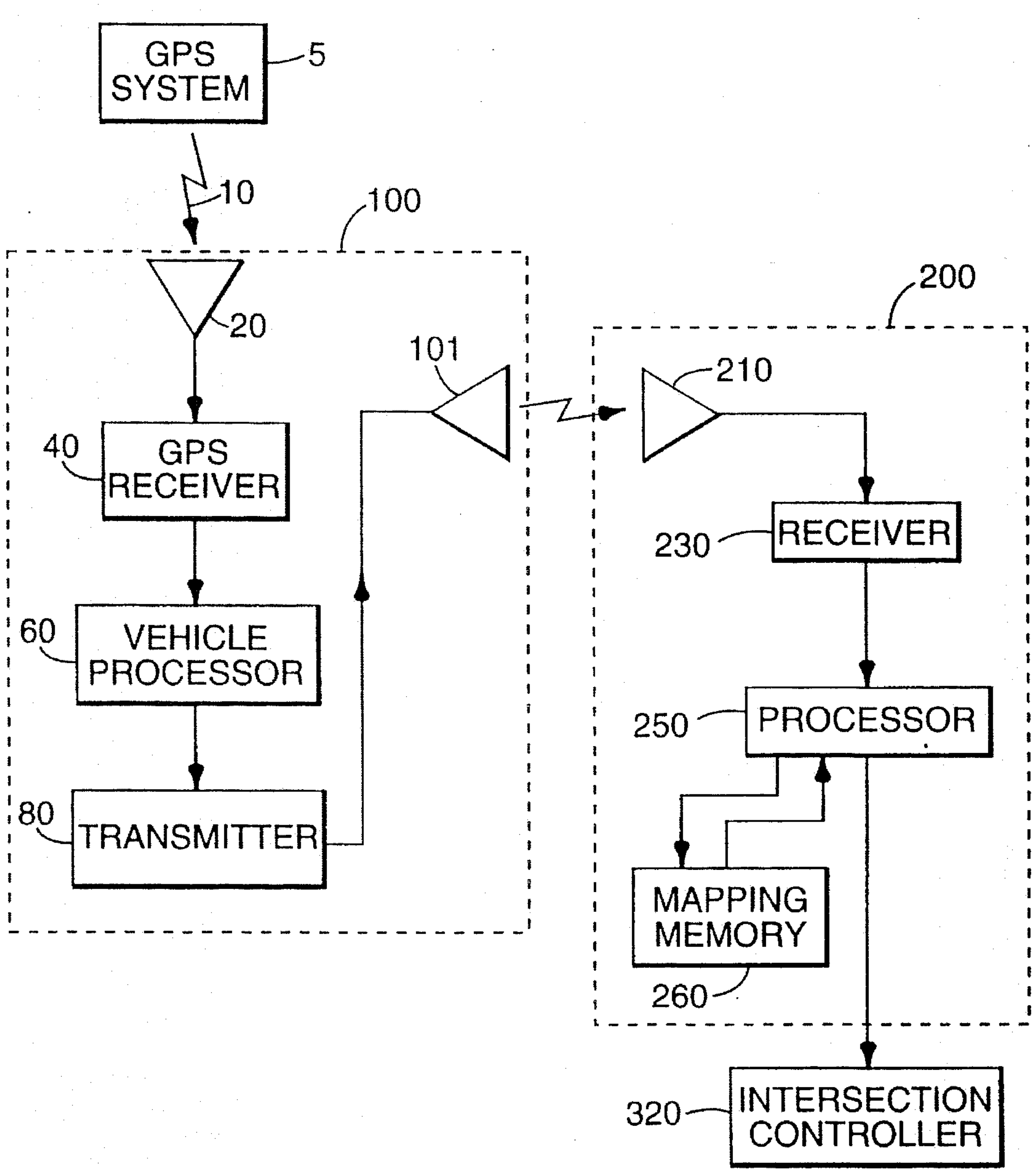
FIG. 1 shows a system level block diagram of a first embodiment of the present traffic control preemption system.

FIG. 1 shows a system level block diagram of a preferred embodiment of the present GPS-based traffic control preemption system. The present preemption system utilizes information received from a global positioning system (GPS) 5 to determine whether a particular vehicle is within an allowed approach of an intersection. The GPS 5 is well known and has many defense and civillian uses. The GPS 5 is a space-based radio navigation system maintained by the U.S. Department of Defense, and consists of a constellation of 18 or more orbiting satellites. From these satellites, any user equipped with appropriate GPS receivers can determine their position anywhere in the world to within ±100 meters. Error purposely induced into the system by the U.S. Department of Defense limits the accuracy of the GPS for civillian use to ±100 meters. This GPS induced error varies over time. More detail regarding the GPS can be found in the article, "The Global Positioning System", by Ivan A. Getting, IEEE Spectrum, pp. 36–37, December 1993.

The preemption system of FIG. 1 also comprises a vehicle module 100 and an intersection module 200. The GPS signal 10 is received by GPS receiver antenna 20 and transmitted to GPS receiver 40, which is available from Rockwell International Corporation, Richardson, Tex., as Rockwell Corporation Model NAVCORE V™. The GPS receiver 40 processes the GPS signal 10 to determine various navigational data regarding the vehicle, such as the vehicle's position, heading and velocity.

The vehicle position can be measured and processed by the present vehicle module 100 and intersection module 200 by any one of many known navigational coordinate systems. For example, the World Geodetic System (WGS-84) measures position in terms of latitude and longitude. The Earth-Centered, Earth-Fixed (ECEF) system is a spherical coordinate system with its origin at the center of the earth. It shall be understood that position may be measured in these or any other coordinate systems without departing from the scope of the present invention.

In addition to the navigational data regarding the vehicle such as position and heading, the GPS receiver 40 also generates information regarding which set of GPS satellites were used to determine the navigational data. Other data regarding the vehicle, such as priority codes, mode commands, identification codes and traffic control preemption request may also be generated as appropriate by processor 60.

All of the data generated by GPS receiver 40 and by processor 60 (hereinafter referred to collectively as "vehicle data") is then transmitted via transmitter 80 and antenna 101 to the intersection module 200. Intersection module 200 includes a data receiving antenna 210 which receives the vehicle data from the vehicle transmitting antenna 101. The vehicle data is then transmitted to a data receiver 230, which converts the radio frequency signal to digital form and outputs the vehicle data to a processor 250. The receiver antenna 210, receiver 230, transmitter antenna 201 and transmitter 80 are available as Modpak Plus Wireless Modem™, available from Curry Controls Company, Lakeland, Fla.

Each intersection includes an intersection controller 320, which controls the phase of traffic signals at the intersection, allowing alternating directions of traffic to proceed or stop. Such intersection controllers are well-known in the art. Each intersection controller thus controls the traffic signal for all possible approaches to a particular intersection. At a 4-way intersection, vehicles may approach from the north, south, east or west, for example. However, in a radio-based system, preemption requests from all of the allowed approaches, and even those on approaches belonging to different intersections (within range of the receiver antenna 210), are received by the intersection controller. The present preemption system therefor determines whether a vehicle is within one of the allowed approaches to that intersection. In order to properly control the phase of the traffic signal, the intersection module also determines which allowed approach the vehicle is on. This ensures that the intersection controller correctly adjusts the phase of the traffic signals to allow the vehicle to travel in the desired manner and direction through the intersection.

The intersection module 200 tracks the path of a vehicle requesting preemption to determine whether it is within any of the allowed approaches for that intersection. A preprogrammed map of allowed approaches to the intersection is stored in map memory 260. The map is programmed into the intersection module 200 while the module 200 is in "mapping" mode, as is described in more detail below with respect to FIG. 7. To track the vehicle, the vehicle module generates and transmits vehicle data as it travels toward the intersection. Processor 250 compares the received vehicle data with the map of allowed approaches stored in map memory 260. If the vehicle data sufficiently matches one of the allowed approaches, processor 250 determines which phase of the traffic signal is desired and forwards the corresponding preemption request to intersection controller 320.

Figure 2:
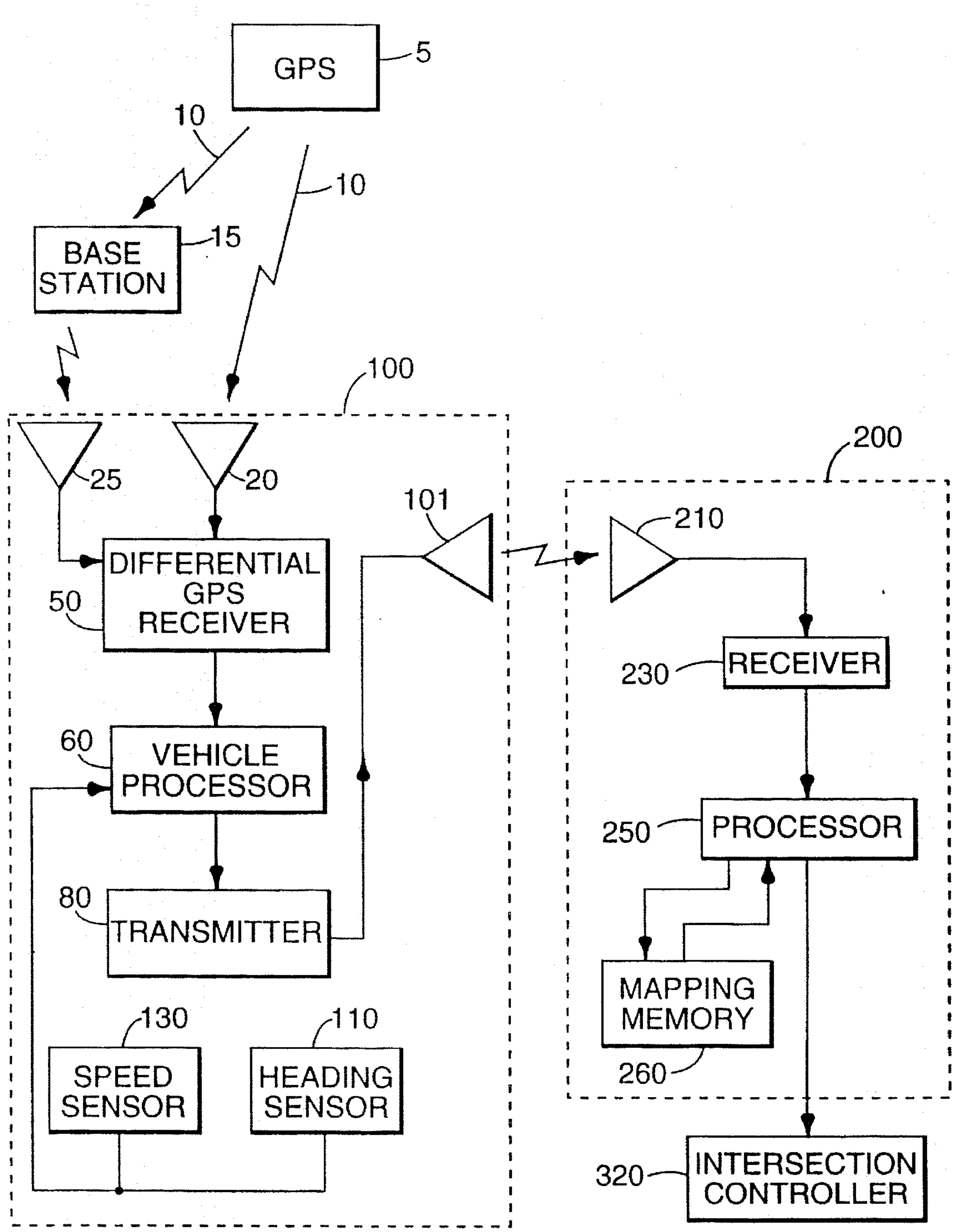
FIG. 2 shows a system level block diagram of an alternate embodiment of the present traffic control preemption system.

Now referring to FIG. 2, an alternate preferred embodiment of the present GPS-based traffic control preemption system is shown. This embodiment employs differential GPS to reduce the effects of the error induced in the GPS signal and improve the accuracy of the present preemption system. For example, the use of differential GPS allows vehicle position to be determined within ±10 meters as opposed to ±100 meters in the system of FIG. 1. The vehicle module 100 of FIG. 2 includes a differential GPS receiver 50 and differential antenna 25. Base station 15 determines the induced error of GPS signal 10, and periodically transmits appropriate correction terms for each visible GPS satellite to the vehicle module via differential antenna 25. To do this, base station 15 is positioned at a surveyed location. Base station 15, as well as GPS antenna 20 in the vehicle module 100, receives the GPS signal 10 and calculates its position therefrom. However, because base station 15 is positioned at a known location, it compares its known position to the position determined from GPS signal 10 to determine the induced error for each visible satellite in the GPS 5. Based on known variation rates of past GPS induced error, base station 15 preferably transmits updates of the induced error for each satellite to the vehicle module at least once every 10 seconds. Differential GPS receiver 50 then applies the correction terms to the vehicle data determined from GPS signals 10 to arrive at corrected, and thus more accurate, set of vehicle data. Base station 15 and differential GPS receiver 50 are available from Trimble Navigation, Sunnyvale, Calif. Differential GPS corrections are also available via FM subcarrier broadcast service from Differential Corrections, Inc., Cupertino, Calif.

In the preemption system of FIG. 2, in addition to receiving vehicle data such as heading, position and velicity from the GPS 5, vehicle data is also provided by a speed sensor 130 and a heading sensor 110, such as an electronic/magnetic compass or gyroscope. These sensors are used to provide vehicle data such as velocity and heading in the event that GPS signals should for some reason become unavailable, as described below with respect to FIG. 6. The information provided by these sensors also result in a more robust system as a check on the GPS generated vehicle data.

Figure 3:
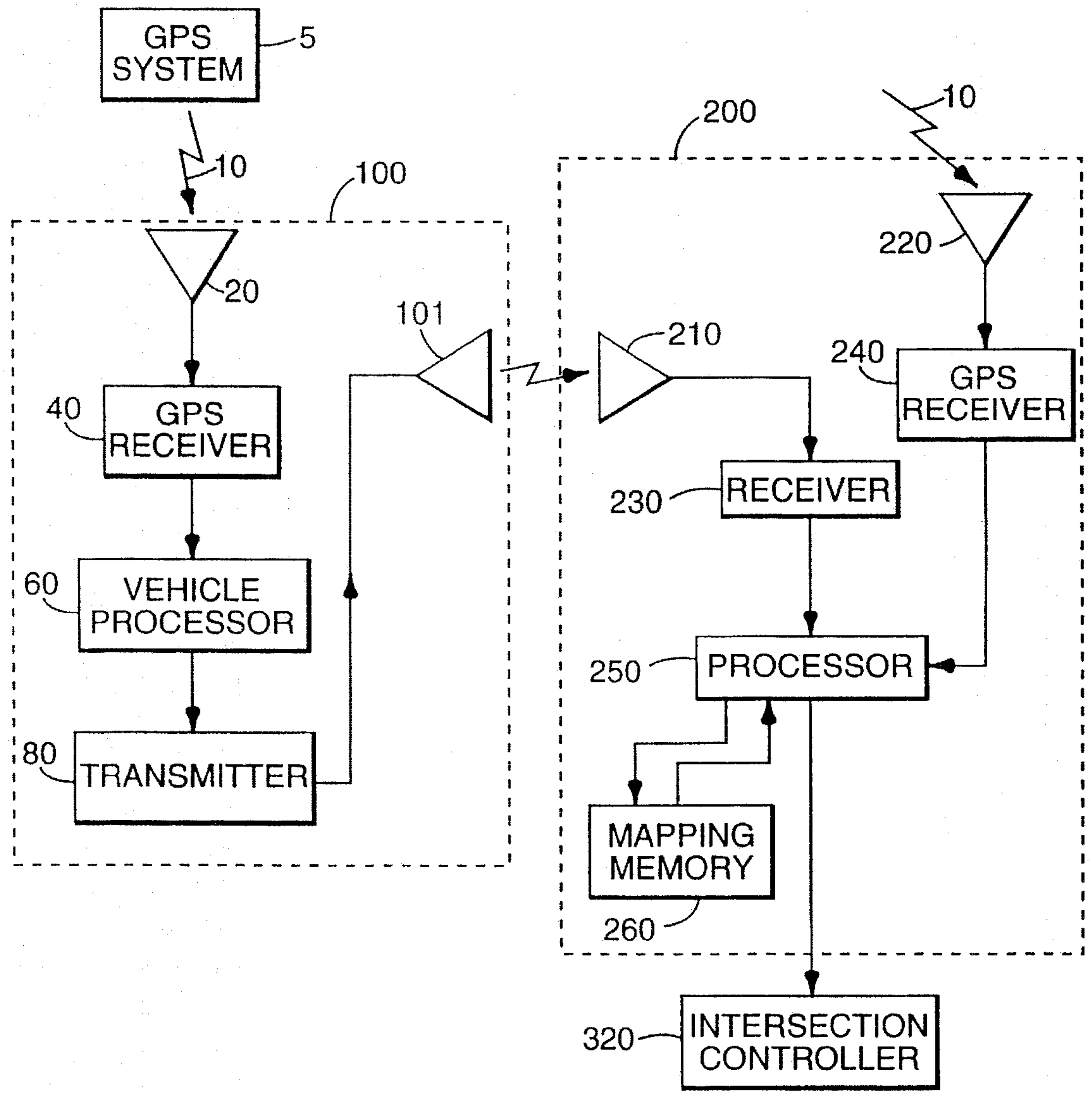
FIG. 3 shows a system level block diagram of an additional alternate preferred embodiment.

FIG. 3 shows a system level block diagram of another alternate preferred embodiment of the present preemption system. This system employs a pseudo-differential technique to reduce the effects of the GPS induced error. Instead of a separate base station such as shown in FIG. 2, intersection module 200 is positioned at a known location and includes a GPS antenna 220 and GPS receiver 240. The vehicle data transmitted by the vehicle includes data regarding the set of GPS satellites used by the vehicle module 100 to generate the vehicle data. In this way, both vehicle GPS receiver 40 and intersection GPS receiver 240 are tuned to receive navigational data from the same set of satellites, such that the induced GPS error is common to the computed locations for the vehicle and the intersection. When the relative distance between the vehicle location and the intersection location is computed, the actual distance between the vehicle and the intersection is obtained and the common induced error is removed. Thus, the pseudo-differential preemption system of FIG. 3 has the advantage of improved accuracy. Although not shown, it shall be understood that the pseudo-differential of FIG. 3 could also include speed and heading sensors such as those shown in FIG. 2.

Figure 4:
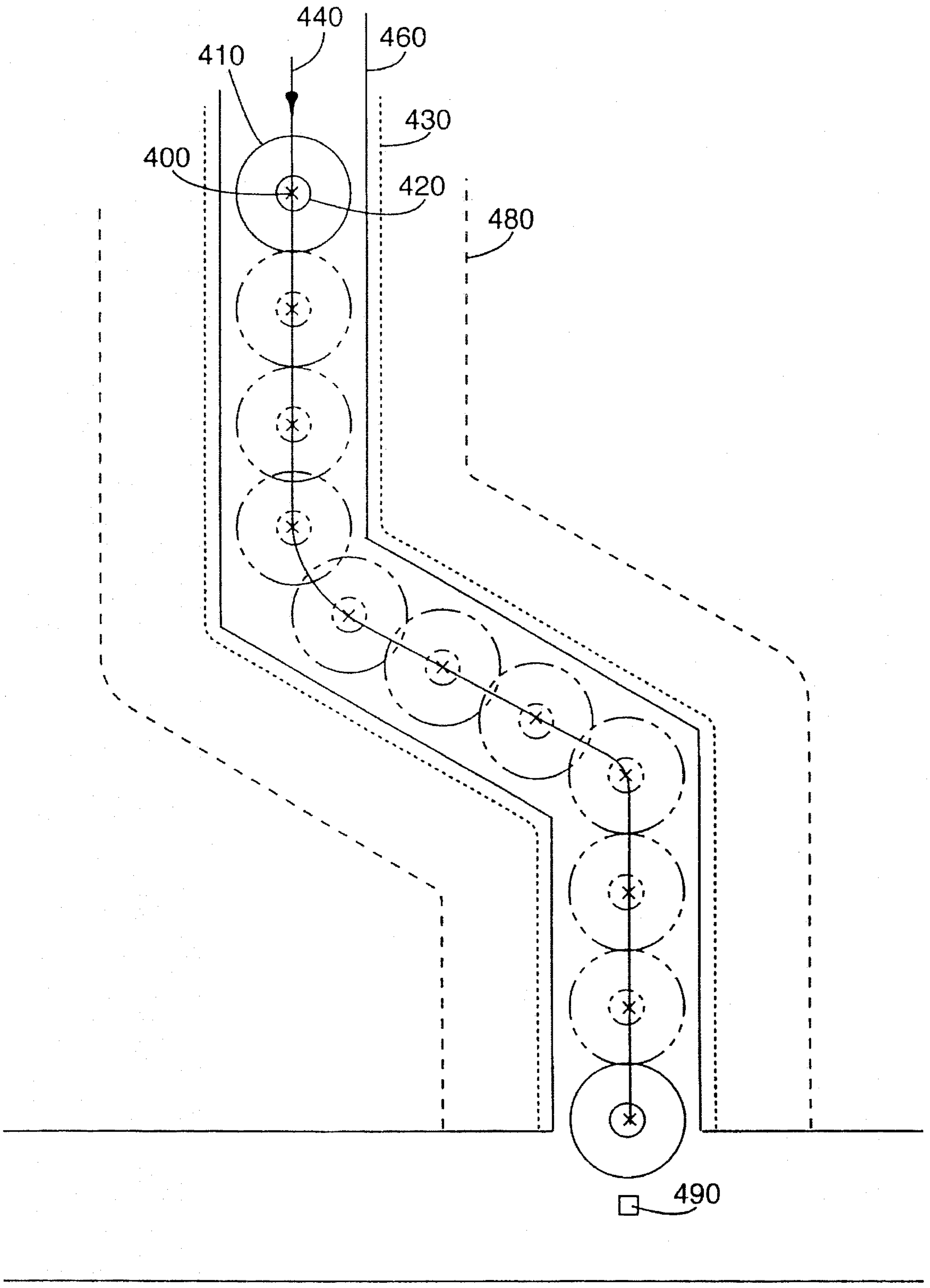
FIG. 4 shows a schematic roadway diagram illustrating operation of the traffic control preemption systems of FIGS. 1 and 2.

FIG. 4 shows the operation (not to scale) of the preemption systems of FIG. 1 and FIG. 2. A vehicle follows roadway 460 toward intersection 490 along approach path 440. Intersection 490 has an associated intersection module (not shown). At periodic intervals 400 along approach path 440, the vehicle transmits vehicle data to an intersection module 200 located at intersection 490. For the first preferred embodiment of FIG. 1, the position component of the vehicle data is determined within an error radius 410 due to the GPS induced error. In addition, the GPS induced error encountered during mapping of the allowed approach adds an additional error of ±100 meters. Thus, the total allowed approach corridor for the embodiment of FIG. 1 is represented by dashed line 480, or ±200 meters.

For the alternate preferred embodiment of FIG. 2, use of differential GPS reduces the vehicle position error radius to radius 420 (±10 meters). Including the differential error encountered during mapping of the allowed approaches, the dimensions of the resulting allowed approach corridor 430 are thus reduced to ±20 meters, and thus more closely approximates the width of roadway 460.

Figure 5:
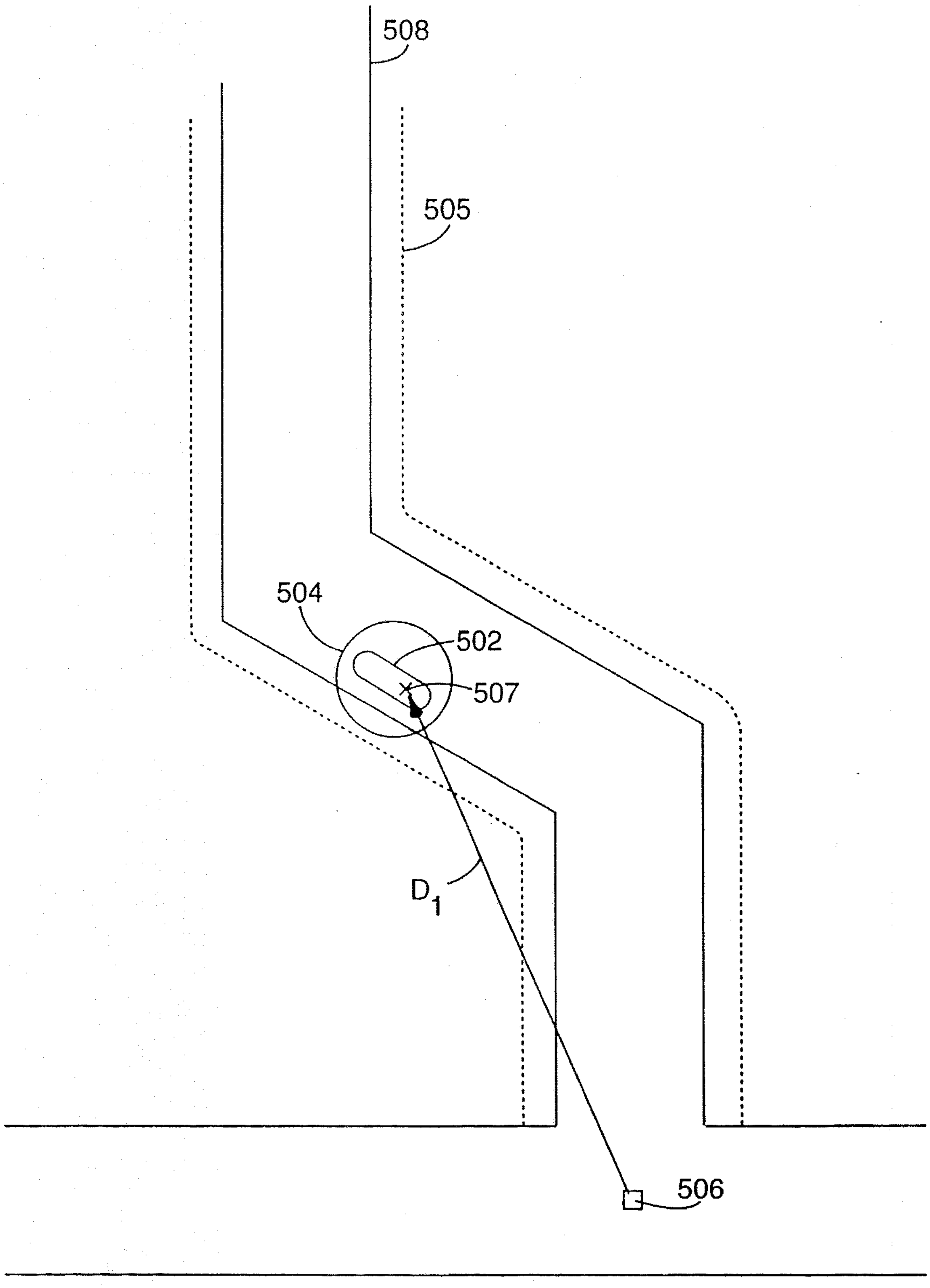
FIG. 5 shows a schematic roadway diagram illustrating operation of the traffic control preemption system of FIG. 3.

Now referring to FIG. 5, the operation of the alternate preferred embodiment of FIG. 3 using pseudo-differential GPS is shown. The vehicle 502 is shown approaching an intersection 506, which includes the intersection module 200 of FIG. 3. At periodic intervals 507 along roadway 508, the vehicle module transmits vehicle data to the intersection module. For purposes of illustration, the vehicle is shown at only one point on roadway 508. The position component of the vehicle data has an error radius 504. Because both the vehicle module and intersection module are tuned to the same set of satellites, the GPS induced error is common to both the vehicle location and the intersection location. Thus the absolute distance between the vehicle and the intersection, represented by vector $D_1$ can be determined by subtracting the computed locations. If the computed vehicle location vectors match the preprogrammed map of allowed approaches, the vehicle is determined to be within the allowed preemption corridor.

For the embodiment of FIG. 3, use of pseudo-differential GPS reduces the vehicle position error radius to ±20 meters. Including the pseudo-differential error encountered during mapping of the allowed approaches, the dimensions of the resulting allowed approach corridor 505 is reduced to ±40 meters.

Figure 6:
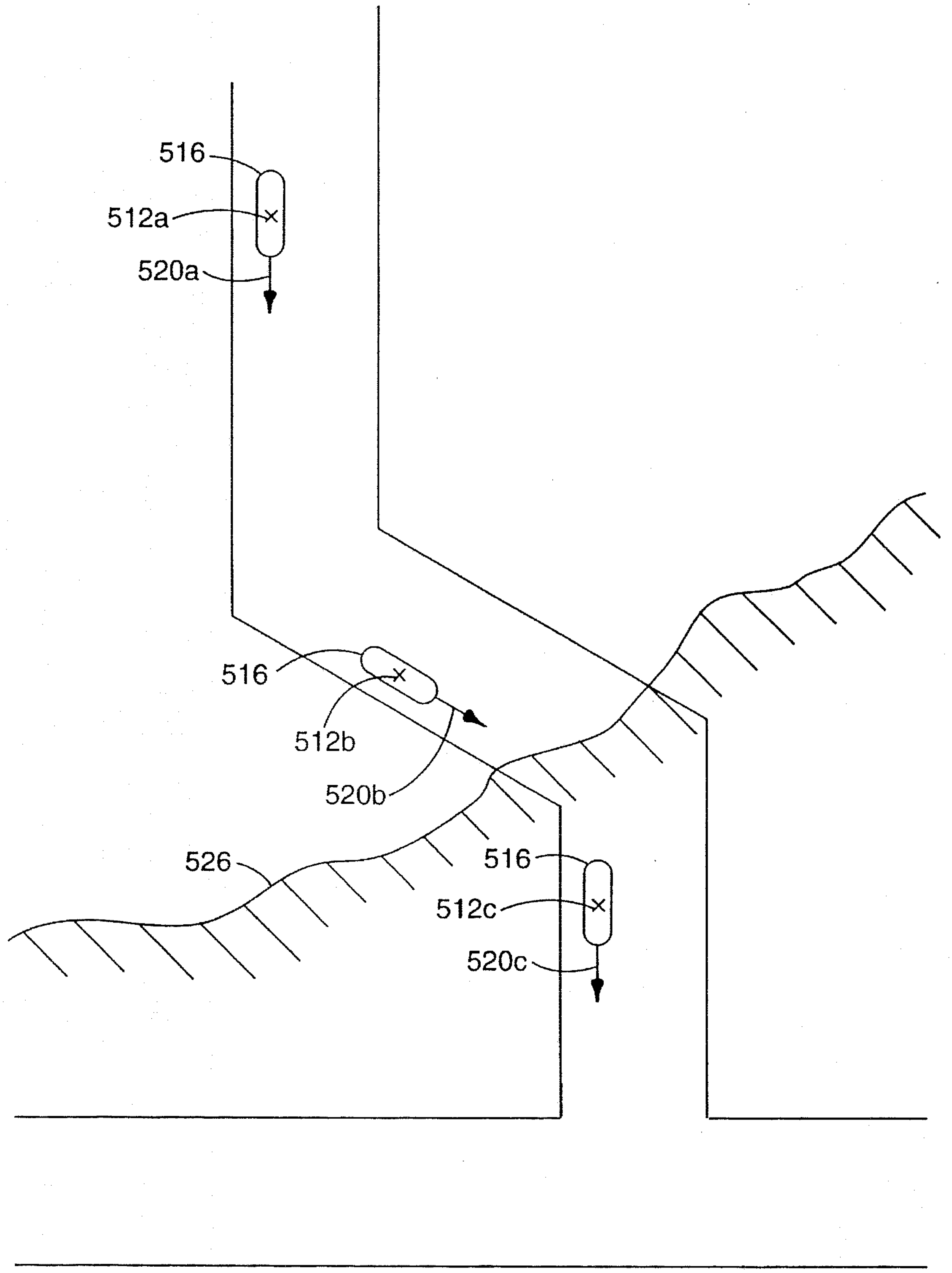
FIG. 6 shows a schematic roadway illustrating operation of the present preemption system in a GPS obstruction or multipath zone.

Now referring to FIG. 6, operation of the preemption system of FIG. 2 during obstruction of the GPS signal is shown. The GPS signal 10 as shown in FIGS. 1, 2 and 3 can be obstructed by tall buildings or other structures. When obstructed, an alternate navigation system is required. The vehicle 516 is shown in a first position **512*a* and a first velocity indicated by the magnitude of vector 520*a* and a first direction as indicated by the arrow of vector 520*a*. The vehicle 516 includes a speed sensor 130 and heading sensor 110 (both shown in FIG. 2) which are used to provide redundant data regarding the vehicle's velocity and heading. At position 512*b*, vehicle 516 is about to enter a GPS obstruction zone 526, a region where, for whatever reason, GPS signals are not available. The information from speed and heading sensors is used in the GPS obstruction zone for dead reckoning of the vehicle's position. Using well-known dead reckoning techniques, the vehicle position at location 512*c* can be determined knowing the vehicle's last known position 512*b*, last known velocity indicated by vector 520*b* and the current velocity and heading as determined by speed and heading sensors 130 and 110, and indicated by vector 520*c*. The vehicle data thus determined is then transmitted in the normal way to intersection module 200** to determine whether the vehicle is within an allowed approach for that intersection.

Figure 7:
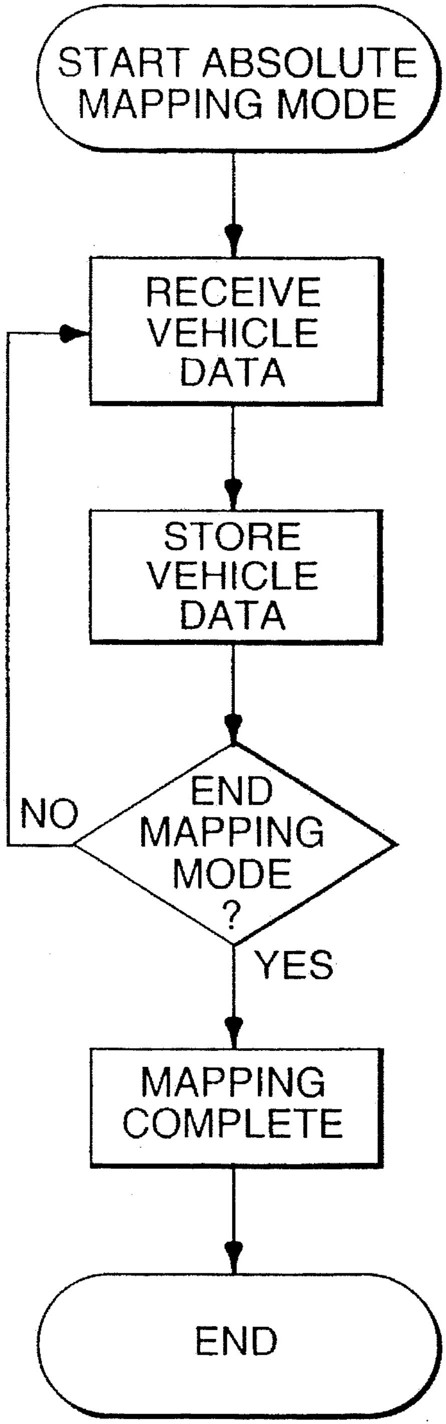
FIG. 7 shows the control flow of absolute position mapping of the preemption system of FIGS. 1 and 2.

FIG. 7 shows the control flow for programming the map of allowed approaches using the preemption system of FIGS. 1 or 2. This procedure is referred to as absolute position mapping. To perform this procedure, a vehicle including a vehicle module 100 begins approaching the intersection module to be programmed along a desired approach such as roadway 460 of FIG. 4. At periodic intervals, one second for example, or alternatively periodic interval positions, the vehicle transmits vehicle data, including a map mode command, to the intersection module. This causes the mapping mode control flow of FIG. 7 to begin execution in the intersection module. The vehicle data is received by the intersection module 200, and is stored in mapping memory 260. When the desired approach is completed, an end map mode command is transmitted by the vehicle to indicate that the mapping is complete, ending the mapping mode control flow of FIG. 7.

Figure 8:
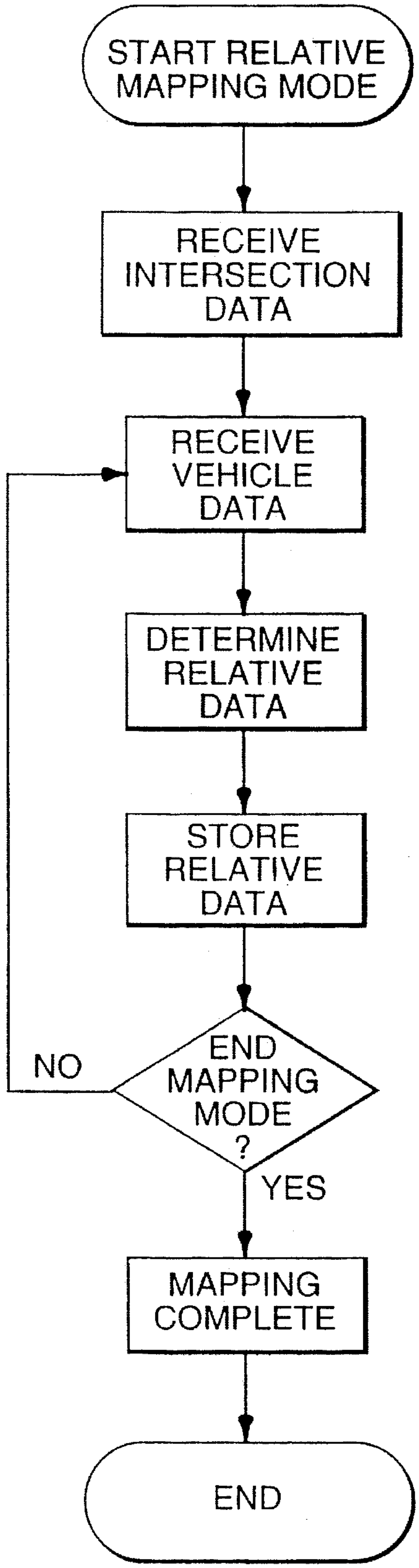
FIG. 8 shows the control flow for relative position mapping of the preemption system of FIG. 3.

FIG. 8 shows the procedure for programming the map of allowed approaches for the preemption system of FIG. 3. This procedure employs pseudo-differential, or relative position mapping, in which the vehicle's data is determined relative to the data for the intersection. In this mapping mode, a vehicle approaching an intersection periodically transmits vehicle data, including a map mode command and data regarding which GPS satellites were used to determine the vehicle data, to the intersection module. This causes the pseudo differential mapping control flow of FIG. 8 to begin execution in the intersection module. The intersection data is also computed. The vehicle data relative to the intersection data is then determined as described above with respect to FIG. 3. This data is then stored in mapping meory 260. Again, when the mapping of the desired approach is completed, an end map mode command is transmitted to the intersection module to indicate that the mapping is complete.

Figure 9:
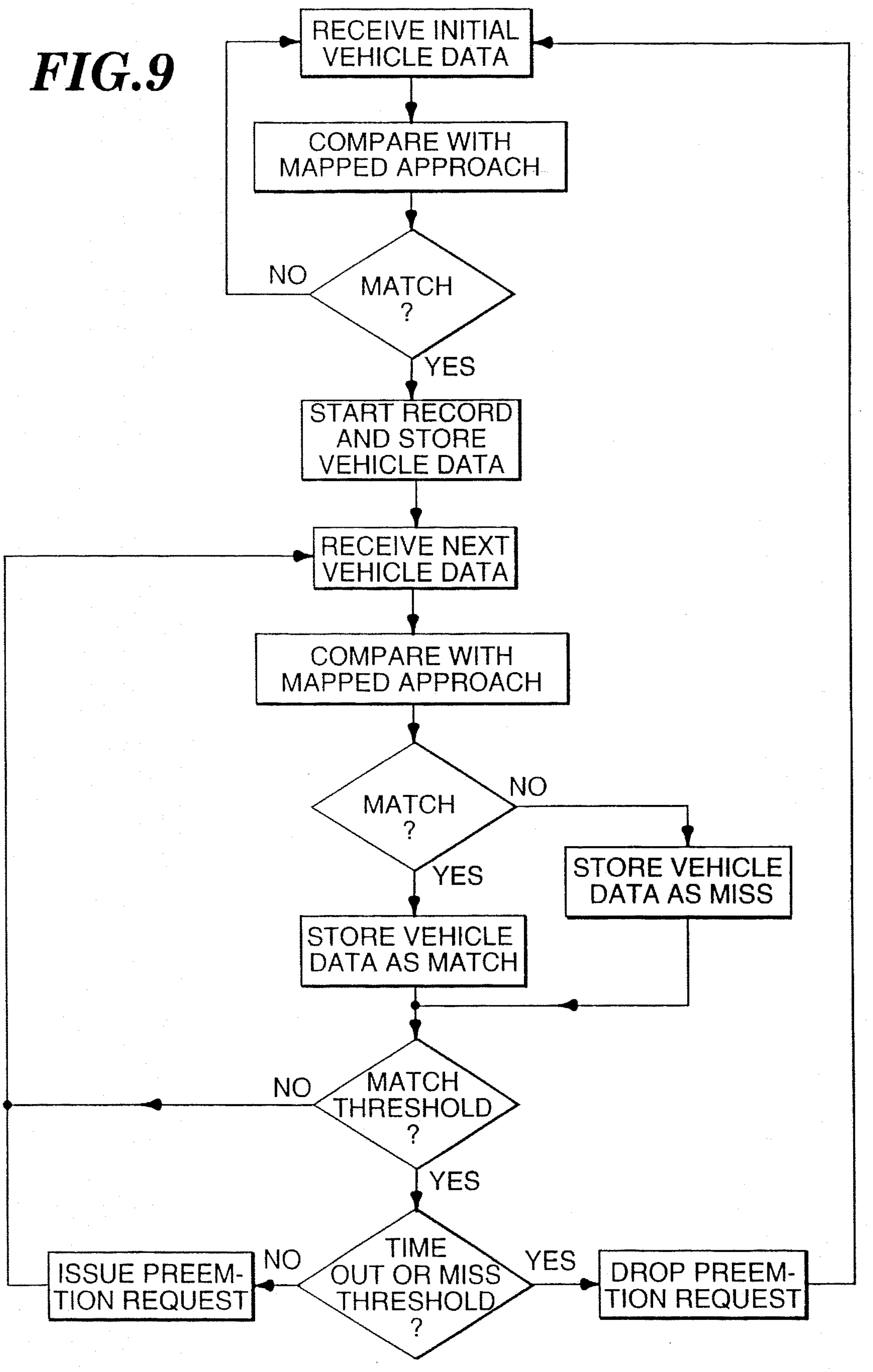
FIG. 9 shows the control flow for tracking of vehicle position to determine whether a vehicle is in the allowed preemption corridor.

FIG. 9 shows the control flow for tracking of a vehicle by any one of the intersection modules 200 shown in FIGS. 1, 2 or 3. Tracking is performed by the intersection module to determine whether a vehicle requesting preemption is within an allowed approach of an intersection. Intersection module 200 first receives an initial set Of vehicle data, which is compared to the map of allowed approaches. If the initial vehicle data matches data in the map of allowed approaches to within a defined degree of accuracy, an approach record is initialized, and the vehicle data is stored. If the initial vehicle data does not match any data points in the map, that vehicle is determined to be outside an allowed approach. However, the control flow continues to check subsequently received vehicle data in the event that the vehicle later enters an allowed approach.

Once an initial vehicle data point is found to match data in the map, the next vehicle data are received by the intersection module and compared to the map of allowed approaches. Each vehicle data point is stored as a "miss" or a "match". This process continues until a minimum number of matched vehicle data points are found (the "match threshold"). The match threshold tests that a vehicle is within an allowed approach for a minimum number of received vehicle data points. This ensures that the vehicle is within the allowed approach path for a sufficient length of time to distinguish vehicles that are merely passing through an allowed approach from those that desire to preempt the intersection.

The control flow of FIG. 9 next checks whether the "miss threshold" has been reached. The miss threshold allows for a limited number of non-matching vehicle data points to occur, to avoid a premature determination that a vehicle is not within an allowed approach. After a defined number of successive non-matches is found (the "miss threshold"), the vehicle is determined to be outside an allowed approach.

A timeout procedure allows for the preemption request to be dropped after a defined length of time has elapsed. Such a feature is desirable, for example, when an emergency vehicle is stopped at an accident scene within an allowed approach, but which failed to disable the present preemption system. When the "miss threshold" is reached or a time out is reached, any outstanding preemption request is dropped, and the control flow returns to the top of FIG. 9 and continues to check subsequent preemption requests.

Although specific embodiments have been illustrated and described herein for purposes description of the preferred embodiments, it will be appreciated by those of ordinary skill in the art that a wide variety of alternate and/or equivalent implementations calculated to achieve the same purposes may be substituted for the specific embodiments shown and described without departing from the scope of the present invention. This application is intended to cover any adaptations or variations of the preferred embodiment discussed herein. Therefore, it is manifestly intended that this invention be limited only by the claims .and the equivalents thereof.

We claim:

1. A system for determining whether a vehicle having an associated vehicle path is within an allowed approach of a location, comprising:

navigation means, associated with the vehicle, for generating vehicle data at periodic intervals along the vehicle path, wherein the vehicle data includes vehicle position data;

means for transmitting the vehicle data;

means, associated with the location, for receiving the vehicle data;

mapping means, associated with the location, for storing a plurality of positions corresponding to allowed approaches to the location and providing therefrom a map of allowed approaches;

evaluation means for comparing the vehicle data to the map of allowed approaches to determine whether the vehicle path is within an allowed approach.

2. The system according to claim 1 wherein the mapping means further includes:

means for generating allowed approach data, wherein the allowed approach data is generated at periodic intervals along the allowed approaches;

means for receiving and storing the allowed approach data and creating therefrom the map of allowed approaches.

3. The system of claim 1 wherein the navigation means is adapted to use signals received from a Global Positioning System (GPS).

4. The system of claim 3 further including dead reckoning means on board the vehicle for providing vehicle data when GPS signals are obstructed, the dead reckoning means comprising:

first sensing means for detecting the velocity of the vehicle;

second sensing means for detecting the heading of the vehicle; and means, connected to receive the velocity and heading of the vehicle, for determining a vehicle position based on the velocity and heading of the vehicle.

5. The system of claim 1 wherein the transmitting means is a radio frequency transmitter.

6. The system of claim 1 wherein the transmitting means is an optical frequency transmitter.

7. The system of claim 1 wherein the vehicle data further includes identification codes and priority codes.

8. The system of claim 1 wherein the vehicle data comprises position, heading and velocity data corresponding to the vehicle.

9. The system of claim 1 wherein the navigation means is adapted to use signals received from a Differential Global Positioning System.

10. The system of claim 1 wherein the vehicle data further includes vehicle heading and vehicle velocity data.

11. A traffic control preemption system, comprising:

a vehicle module associated with a vehicle having a corresponding vehicle path, the vehicle module comprising:

means for receiving signals from a Global Positioning System and for generating therefrom vehicle data, wherein the vehicle data is generated at periodic interval positions along the vehicle path; and means for transmitting the vehicle data; and an intersection module associated with an intersection and adapted to track the vehicle path, the intersection module comprising:

a programmed map of allowed approaches to the intersection; and a processor adapted to receive and compare the vehicle data to the programmed map to determine whether the vehicle path is within an allowed approach;

such that if the vehicle is within an allowed approach to the intersection the vehicle is allowed to preempt traffic signals associated with the intersection.

12. The system of claim 11 wherein the vehicle data further includes vehicle heading and vehicle velocity data.

13. The system of claim 11 wherein the intersection module is further adapted to send a preemption request to an intersection controller if the vehicle path is within an allowed approach.

14. The system of claim 11 wherein the transmitting means is a radio frequency transmitter.

15. The system of claim 11 wherein the transmitting means is an optical frequency transmitter.

16. A traffic control preemption method which uses data received from a global positioning system (GPS) to determine whether a vehicle, having an associated vehicle path, is allowed to preempt traffic signals at an intersection, comprising the steps of:

(a) receiving GPS signals;

(b) processing the GPS signals on-board the vehicle so as to generate vehicle data;

(c) transmitting the vehicle data;

(d) providing a map of allowed approaches, wherein the map of allowed approaches comprises a plurality of preprogrammed allowed positions proximate to the intersection;

(e) comparing the vehicle data with the map of allowed approaches;

(f) determining, based on comparing step (e), whether the vehicle is within one of the allowed approaches; and (g) allowing the vehicle to preempt the traffic signals associated with the intersection if the vehicle is within one of the allowed approaches.

17. The traffic control preemption method of claim 16 wherein the step of transmitting vehicle data comprises the step of transmitting vehicle position, heading and velocity data.

18. The method of claim 16 wherein the step of providing a map of allowed approaches further comprises the steps of:

(a) receiving GPS signals at a first position of an allowed approach;

(b) processing the GPS signals to generate mapping data;

(c) transmitting the mapping data;

(d) programming the mapping data to generate the map of allowed approaches;

(e) receiving GPS signals at a next position of the allowed approach path;

(f) repeating steps (b)–(e) until the allowed approach path is completely mapped.

19. A method of determining whether a vehicle is allowed to preempt a traffic signal, comprising the steps of:

(a) receiving a first position signal indicative of a first location of the vehicle;

(b) determining whether the received position signal is within a mapped approach to the traffic signal;

(c) recording the received position signal as a match if the received position signal is within an allowed approach;

(d) receiving a next position signal indicative of a next location of the vehicle;

(e) determining whether the received position signal is within a mapped approach;

(f) recording the received position signal as a match if the received position signal is within a mapped approach;

(g) repeating steps (d)–(f) until a match threshold is reached;

(h) issuing a preemption request if the match threshold is reached;

(i) repeating steps (d)–(h) as long as next position signals are received.

* * * * *

US005539398C1

(12) EX PARTE REEXAMINATION CERTIFICATE (10562nd)

United States Patent

Hall et al.

(10) Number: US 5,539,398 C1
(45) Certificate Issued: Apr. 7, 2015

(54) GPS-BASED TRAFFIC CONTROL PREEMPTION SYSTEM

(75) Inventors: Timothy J. Hall, North St. Paul, MN (US); Mark A. Schwartz, River Falls, WI (US); Steven M. Hamer, Willernie, MN (US)

(73) Assignee: Garrison Loan Agency Services LLC, New York, NY (US)

Reexamination Request:
No. 90/013,387, Oct. 30, 2014

Reexamination Certificate for:
Patent No.: 5,539,398
Issued: Jul. 23, 1996
Appl. No.: 08/515,933
Filed: Aug. 16, 1995

Related U.S. Application Data

(63) Continuation of application No. 08/178,881, filed on Jan. 7, 1994, now abandoned.

(51) Int. Cl.
*G08G 1/087* (2006.01)
*G08G 1/01* (2006.01)

(52) U.S. Cl.
CPC .............. *G08G 1/087* (2013.01); *G08G 1/0145* (2013.01)

(58) Field of Classification Search
None
See application file for complete search history.

(56) References Cited

To view the complete listing of prior art documents cited during the proceeding for Reexamination Control Number 90/013,387, please refer to the USPTO's public Patent Application Information Retrieval (PAIR) system under the Display References tab.

*Primary Examiner* — Dennis Bonshock

(57) ABSTRACT

A traffic control preemption system uses data received from a global positioning system (GPS) to determine whether a vehicle issuing a preemption request is within an allowed approach of an intersection. GPS signals are received and processed by the vehicle module to generate vehicle data, including the vehicle's position, heading and velocity. The vehicle data is transmitted via radio transmission or some other medium. Each intersection has an associated intersection module which, if within range of the vehicle's transmitting equipment, compares the received vehicle data with a preprogrammed map of allowed approaches to the intersection. If the vehicle data sufficiently matches the map of allowed approaches, the vehicle's preemption request is forwarded to the intersection controller to appropriately control the phase of the traffic signal at the intersection.

**Attention is directed to the decision of *Global Traffic Technologies, LLC* v. *Emtrac Systems, Inc. et al.*, U.S. District Court-Minnesota, Decision date: May 16, 2014; *Minnesota Mining* v. *Midwest Traffic Prod*, U.S. District Court-Minnesota, Decision date: Feb. 11, 1999 relating to this patent. This reexamination may not have resolved all questions raised by these decisions. See 37 CFR 1.552(c) for *ex parte* reexamination and 37 CFR 1.906(c) for *inter partes* reexamination.**

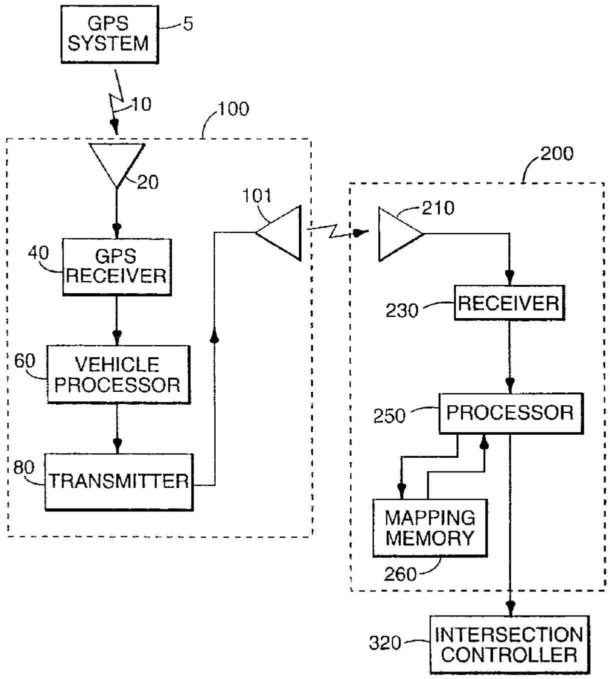

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-19 is confirmed.

* * * * *